J. J. STOCK.
BUMPER.
APPLICATION FILED AUG. 3, 1921.

1,419,775.

Patented June 13, 1922.

WITNESSES

INVENTOR
John J. Stock
BY
ATTORNEYS

UNITED STATES PATENT OFFICE.

JOHN J. STOCK, OF PHILADELPHIA, PENNSYLVANIA.

BUMPER.

1,419,775. Specification of Letters Patent. Patented June 13, 1922.

Application filed August 3, 1921. Serial No. 489,526.

*To all whom it may concern:*

Be it known that I, JOHN J. STOCK, a citizen of the United States, and a resident of Philadelphia, in the county of Philadelphia and State of Pennsylvania, have invented a new and Improved Bumper, of which the following is a full, clear, and exact description.

My invention relates to a bumper and aims to provide a device of this character primarily adapted for use in connection with an amusement vehicle, such as has been illustrated in my prior Patent No. 1,339,299, dated May 4, 1920, it being understood, however, that the present invention is not necessarily limited to this adaptation.

It is a well understood fact in connection with pleasure rides in which a number of vehicles are utilized, which vehicles engage each other, or relatively fixed surfaces, that it is necessary to provide cushioning means which will prevent the transmission of too great a shock to the parts of the vehicle and the occupants therein when this engagement is effected. With this in mind a number of bumpers have been placed upon the market with a view of providing a means which would serve to cushion the shocks incident to the engagement of a vehicle with a second vehicle or with relatively fixed surfaces. These bumpers for the most part have often a number of objections, among which will be noted the fact that they were relatively cumbersome and consequently added material weight to the vehicle that they did not effectually cushion the shocks and also that the cushioning properties were quickly lost after the bumper has been subjected to usage for a certain length of time.

Thus my present inventions aims to provide a bumper which is, as aforestated, primarily adapted for use in connection with vehicles of a pleasure ride, but is not necessarily limited to use in this connection, and by means of which, primarily, an element will be presented which may readily be manufactured and subsequently associated with a vehicle and which will further be capable of withstanding a great amount of usage and which will at all times effectually cushion shocks.

With these and further objects in mind reference is had to the attached sheet of drawings as illustrating one practical embodiment of my invention, and it will be seen from these drawings that Figure 1 is a side elevation of a pleasure vehicle and showing my improved type of bumper associated therewith;

Figure 1:
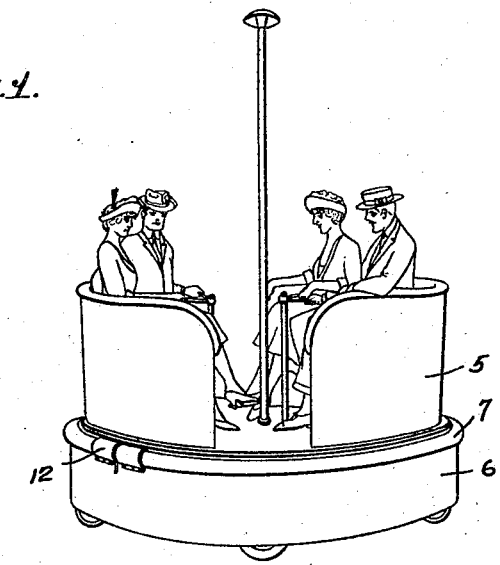
Figure 2:
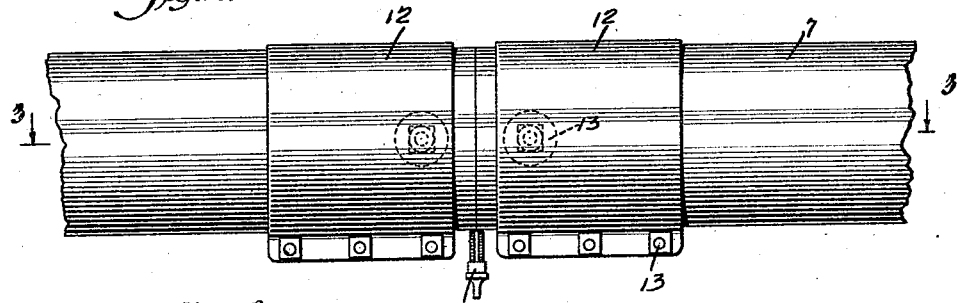
Figure 2 is a fragmentary side elevation of the ends of said bumper element.
Figure 4:
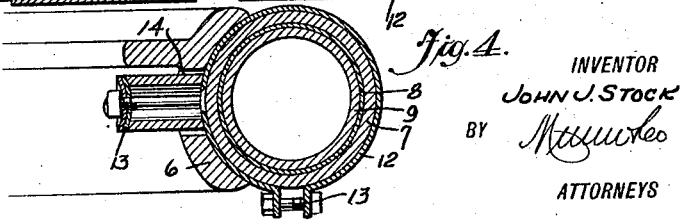
Figure 4 is a transverse sectional view of the device as shown in Figures 2 and 3.

Referring now more particularly to Figure 1, it will be seen that reference numeral 5 indicates the body of a pleasure vehicle, which in the embodiment illustrated, is annular or tub-shaped, the outermost portion 6 of said vehicle being provided with a groove (clearly shown in Figure 4), within which the body of the bumper lies.

Figure 3:
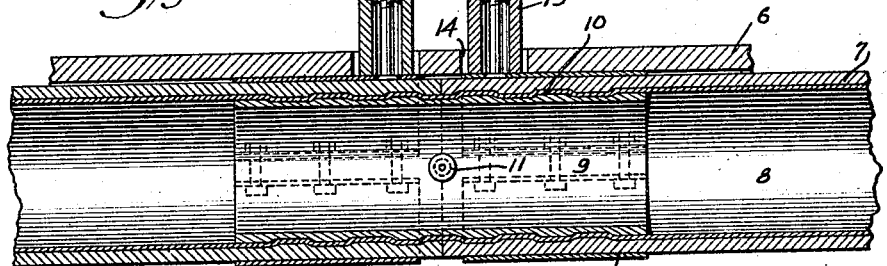
Figure 3 is a sectional side view taken along the line 3—3 and in the direction of the arrows indicated in Figure 2.

It will be seen in Figure 3 that the body of the bumper preferably includes an exterior tube-shaped casing 7 which is retained in an inflated condition by means of an inner tube 8 as in the case of a pneumatic tire. However, the body of each of these tubes is cut transversely to provide a pair of end portions so that the device may readily be applied to the groove formed in the body of the vehicle.

To now provide means which will serve to join the ends of the tubes together in such a manner as to guard against fluid leakage, and which will further serve to provide attaching means anchoring the tubes to the body of the vehicle, it will be noted upon reference being had to Figure 3, that a sleeve 9 is introduced into the ends of the inner tube 8, and with a view of providing a fluid-tight seal at these points, it will be noted that the sleeve is formed with a series of annular ridges 10 upon its exterior face so that the inner tube 8, incident to its elasticity, will lie flush against the exterior face of the sleeve 9, and incident to the engagement with the ridges 10, will be prevented from becoming accidentally detached from this member, as well as providing means insuring a fluid-tight seal.

It will further be noted in this connection that a conventional tire valve 11 may be associated with the sleeve 9, and by this means fluid may be introduced into the inner tube 8. Also to clamp the casing 7 and inner tube 8 in their proper positions with respect to each other and to retain these elements properly applied upon the body of the vehicle a pair of collar-shaped members 12 is employed. Each of these latter members includes the provision of a split band which is circumferentially adjustable by the utilization of bolts and nuts 13 provided for this purpose. Also each of the collars 12 carries a stud 13' which is adapted to extend through an opening 14 forming the base of the groove arranged within the body of the vehicle.

Incident to this construction it will be understood that by tightening the collars by means of the bolts and nuts 13, that the casing 7 may be pressed into intimate contact with the inner tube 8 and these latter elements will be forced into tight engagement with the exterior face of the sleeve 9, thus preventing any accidental detachment of the elements one from the other and also further insuring the provision of a leakproof joint. Further by means of the studs 13' cooperating with the openings 14, it will be appreciated that a circumferential shifting of the bumper with respect to the body of the vehicle will be absolutely precluded, thus guarding against unnecessary wear.

From the foregoing it will be understood that all of the objects set forth in the preamble of this specification are accomplished and it will further be appreciated that numerous modifications of structure might readily be resorted to without in the least departing from the scope of my claims, which are:

1. A bumper for vehicles including a casing presenting a pair of end portions, a sleeve adapted to be inserted into said end portions, and collars encircling said casing.

2. A bumper for vehicles including a casing presenting a pair of end portions, a sleeve adapted to be inserted into said end portions, collars encircling said casing, and points overlying said sleeve.

3. A bumper for vehicles including a casing presenting a pair of end portions, a sleeve adapted to be inserted into said end portions, collars encircling said casing, and ridges formed upon the exterior face of said sleeve.

4. A bumper for vehicles including a casing presenting a pair of end portions, a sleeve adapted to be inserted into said end portions, collars encircling said casing, and annular ridges formed upon the exterior face of said sleeve.

5. A bumper for vehicles including a casing, means for inflating said casing, collars encircling said casing, and lugs forming a part of said collar.

6. A bumper for vehicles including a casing, means for inflating said casing, circumferentially adjustable collars encircling said casing, and lugs forming a part of said collar.

JOHN J. STOCK.